United States Patent [19]
Krupka

[11] Patent Number: 5,161,988
[45] Date of Patent: Nov. 10, 1992

[54] PATCHING PANEL

[75] Inventor: Yaakov Krupka, Rehovot, Israel

[73] Assignee: RIT Technologies Ltd., Tel Aviv, Israel

[21] Appl. No.: 834,086

[22] Filed: Feb. 12, 1992

[30] Foreign Application Priority Data

Feb. 13, 1991 [IL] Israel .................................. 097227

[51] Int. Cl.⁵ .................... H01R 13/70; H01R 13/447
[52] U.S. Cl. ................................ 439/136; 200/50 A; 439/49
[58] Field of Search ................... 439/49, 52, 136, 142, 439/145, 188, 43, 53, 54; 200/50 A

[56] References Cited

U.S. PATENT DOCUMENTS

| Re. 32,760 | 10/1988 | Chandler et al. | 439/188 |
|---|---|---|---|
| 3,627,929 | 12/1971 | Vlijmen | 200/51.1 |
| 3,692,966 | 9/1972 | Lancaster | 200/51.1 |
| 4,080,040 | 3/1978 | Lancaster | |
| 4,140,918 | 2/1979 | Lancaster | 200/51.07 |
| 4,256,936 | 3/1981 | Lancaster | 200/51.07 |
| 4,361,955 | 12/1982 | Lancaster | 29/884 |
| 4,363,531 | 12/1982 | Lancaster | |
| 4,602,883 | 7/1986 | Grabbe et al. | |
| 4,609,242 | 9/1986 | Kemppainen | |
| 4,619,494 | 10/1986 | Noorily et al. | |
| 4,624,521 | 11/1986 | Vachhani | |
| 4,628,159 | 12/1986 | Deitch et al. | 200/51.05 |
| 4,685,887 | 8/1987 | Hanning | 439/188 |
| 4,687,888 | 8/1987 | Hasircoglu | 200/51.1 |
| 4,773,867 | 9/1988 | Keller | 439/49 |
| 4,937,404 | 6/1990 | Kitagawa | 200/51.09 |
| 4,948,376 | 8/1990 | Penning | 439/188 |
| 5,052,940 | 10/1991 | Bengal | 439/188 |
| 5,074,801 | 10/1990 | Siemon | 439/188 |
| 5,078,609 | 1/1992 | Bouchan | 439/43 |

Primary Examiner—Neil Abrams
Attorney, Agent, or Firm—Browdy and Neimark

[57] ABSTRACT

A patching panel including a plurality of port and user socket pairs and apparatus for normally covering individual port and user socket pairs and normally and electrically shorting them together when in a first orientation and for uncovering both of the socket pair and breaking the electrical connection therebetween when in a second orientation.

14 Claims, 4 Drawing Sheets

PATCHING PANEL

FIELD OF THE INVENTION

The present invention relates to electrical connectors generally and more particularly to patching panels for computer communications.

BACKGROUND OF THE INVENTION

Various types of patching panels for computer communications are known. Early patching panels employed external plug-in wiring for all connections between each port and each user, resulting in a "spaghetti" of connection wires. More modern patching panels provide internal connections between preselectable ports and users, thus eliminating much of the spaghetti.

There are also known patching panels which provide internal connections between pairs of ports and users, via a circuit breaking switch. A principal disadvantage of conventional patching panels of this type is the uncertainty as to the position of the switch, which can lead to accidental double patching and can result in computer to user link failures.

Additionally, an extra socket is required for monitoring in addition to the existing user and port sockets. All of the sockets are exposed to dirt and dust in the outside environment which can lead to random failures of the equipment.

SUMMARY OF THE INVENTION

The present invention seeks to provide an improved patching panel.

There is thus provided in accordance with a preferred embodiment of the present invention a patching panel including a plurality of port and user socket pairs and apparatus for normally covering individual port and user socket pairs and normally and electrically shorting them together when in a first orientation and for uncovering both of the socket pair and breaking the electrical connection therebetween when in a second orientation.

In accordance with a preferred embodiment of the present invention, the apparatus for normally covering and shorting includes apparatus for permitting one of the sockets to be uncovered without breaking the electrical connection between the pair of sockets.

Further in accordance with an embodiment of the invention, the apparatus for permitting comprises a hinged cover member which permits access to one of the sockets even when the apparatus for normally covering and shorting is in the first orientation.

Additionally in accordance with a preferred embodiment of the invention, the apparatus for normally covering and shorting is spring loaded to normally assume the first orientation.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
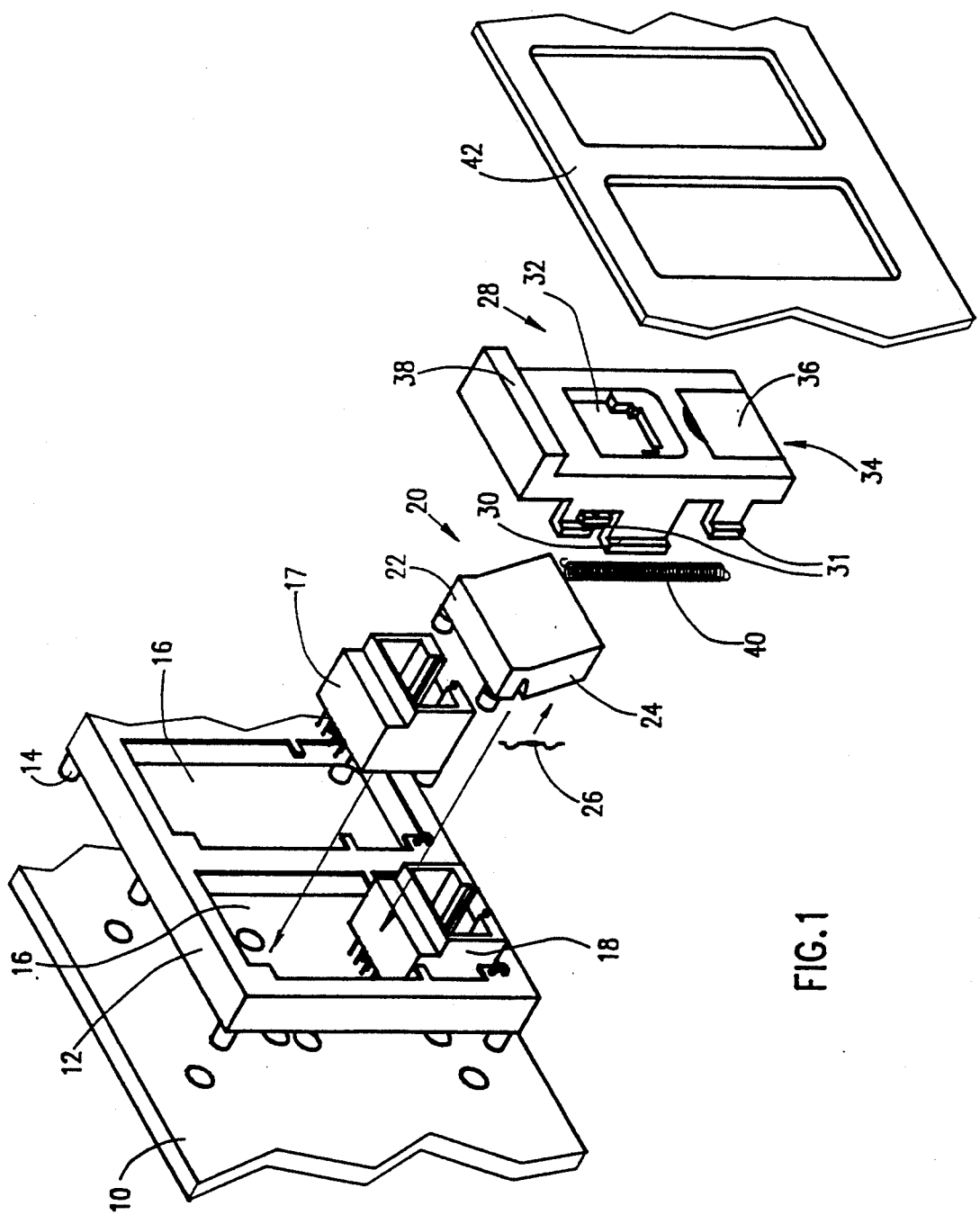
FIG. 1 is an exploded view illustration of part of a patching panel constructed and operative in accordance with a preferred embodiment of the present invention.

Reference is now made to FIG. 1, which illustrates part of a patching panel constructed and operative in accordance with a preferred embodiment of the present invention and includes a back support plate 10 and a forward support frame 12 mounted on back support plate 10 by means of fasteners 14. Forward support frame 12 is formed with an array of apertures 16, each configured for mounting therein of a pair of female sockets 17 and 18, such as RJ 45 sockets meeting ISDN standards.

Mounted on back support plate 10 is a bifurcated electrical switch contactor 20 typically formed of a flexible material, such as plastic or rubber and including a mounting portion 22 and a switch contact portion 24 which is associated with a conductive ribbon spring 26.

Slidably mounted in aperture 16 is a cover assembly 28 including switch contact engaging protrusions 30 and 31 typically on both sides thereof, a first opening 32 and a second opening 34 having a hinged cover 36, as well as handle portion 38. A spring 40 is provided for normally urging cover assembly 28 to a first operative orientation, as will be described hereinbelow. An apertured cover plate 42 is provided to overlie the above-described apparatus.

Figure 2:
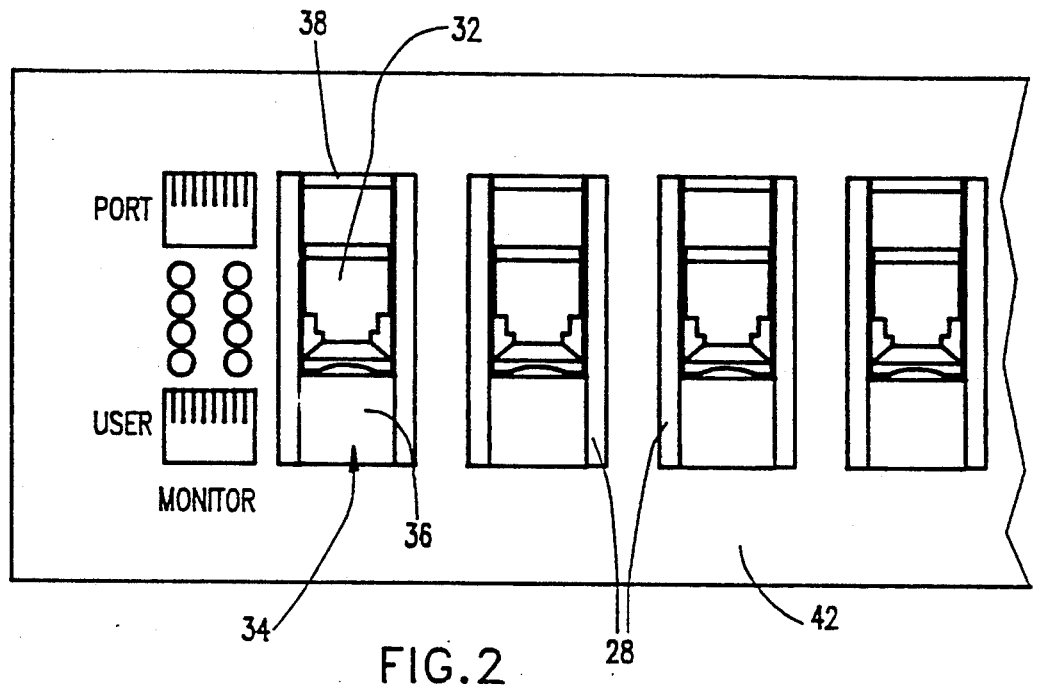
FIG. 2 is a pictorial illustration of part of a patching panel constructed and operative in accordance with a preferred embodiment of the present invention and including a plurality of devices for normally covering and shorting a pair of sockets, all of which are in a first operative orientation.
Figure 3:
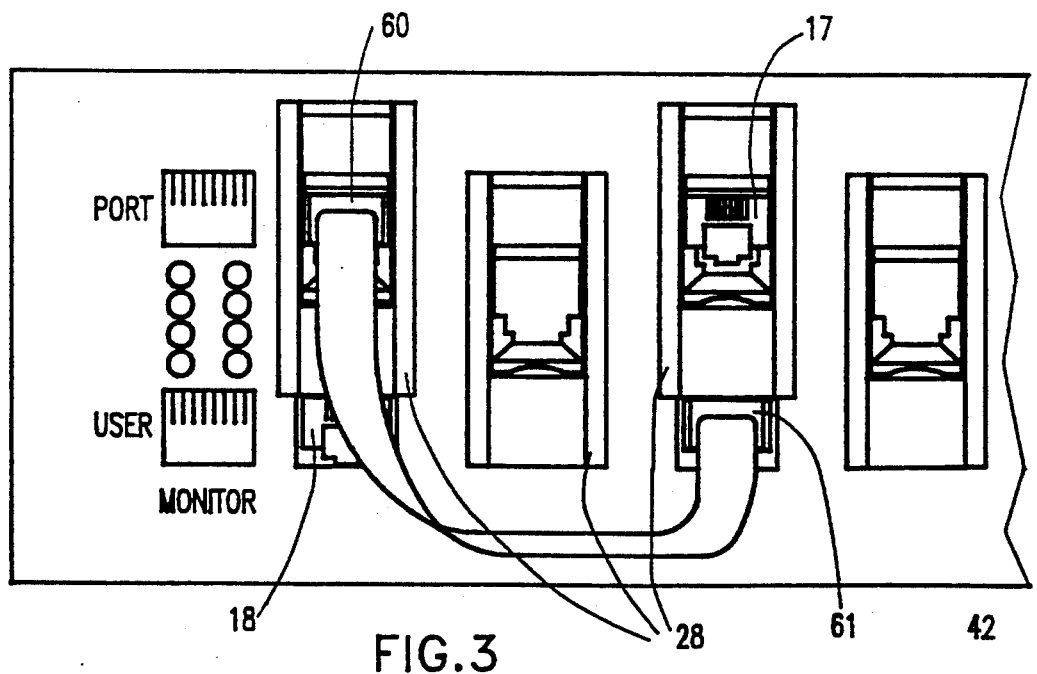
FIG. 3 is a pictorial illustration of part of a patching panel of FIG. 2, wherein two of the devices for normally covering and shorting are in a second operative orientation.
Figure 4:
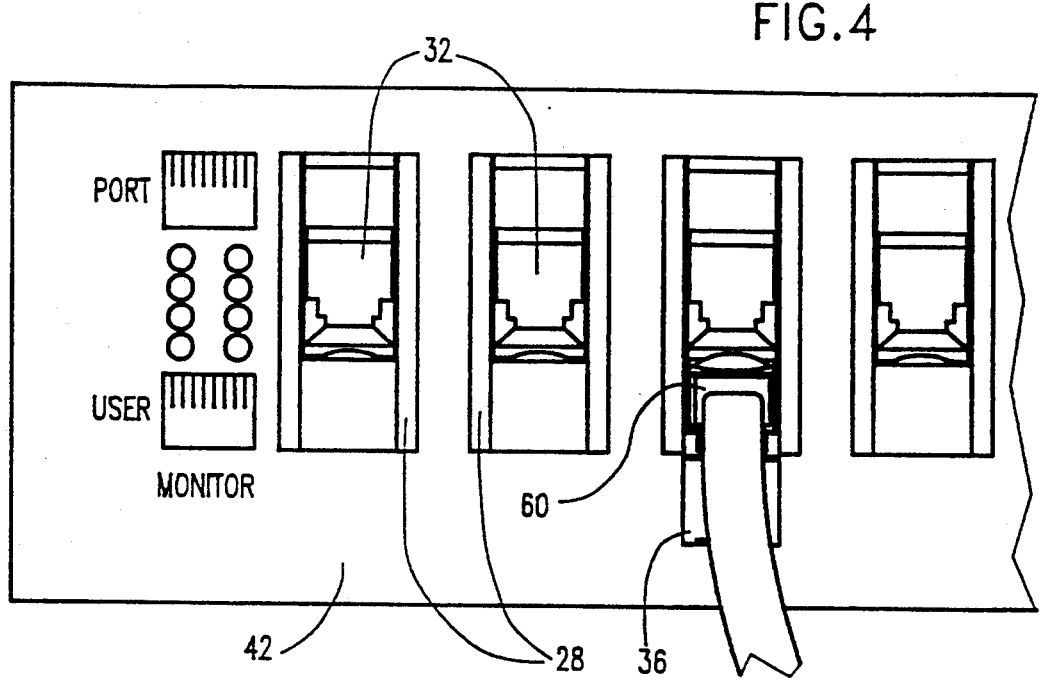
FIG. 4 is a pictorial illustration of part of a patching panel of FIG. 2, wherein one of the devices for normally covering and shorting is in a third operative orientation.
Figure 5:
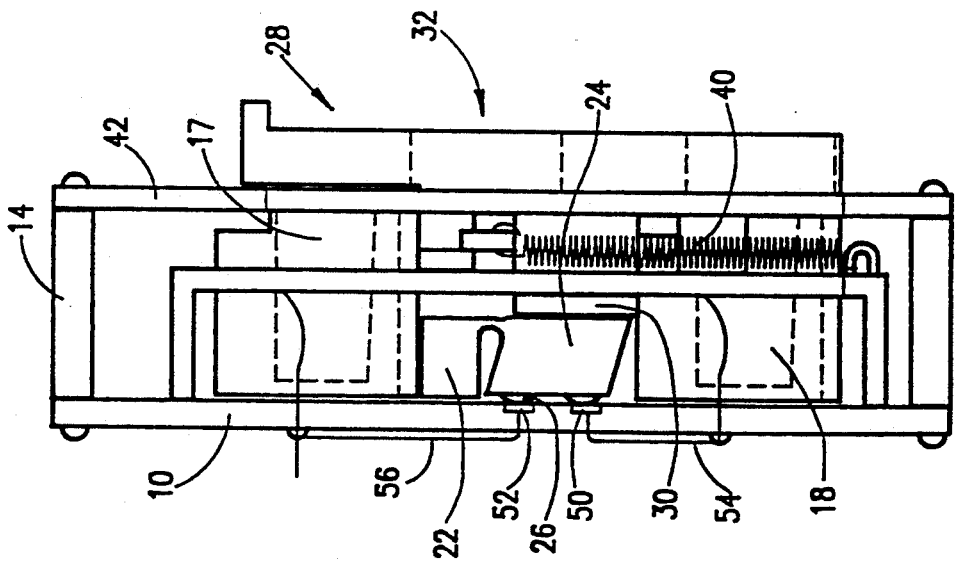
FIG. 5 is a side view sectional illustration of a device for covering and shorting in a first operative orientation.

Reference is now made to FIGS. 2–7 which include illustrations of the apparatus of FIG. 1 in three different operative orientations. FIGS. 2 and 5 are respective pictorial and side sectional views of part of the patching panel of FIG. 1 in a first operative orientation.

As seen in FIGS. 2 and 5, in this first operative orientation, being the orientation which is normally urged by spring 40, cover assembly 28 is oriented such that aperture 32 is not in registration with socket 17 and aperture 34 is covered by cover 36. Thus, in this orientation, both sockets 17 and 18 are covered and the ingress thereinto of contaminating materials is generally prevented.

From a consideration of FIG. 5, it may be seen that when the cover assembly 28 is in the first orientation, protrusion 30 engages switch contact portion 24 forcing it and thus conductive spring 26 against a pair of contacts 50 and 52 which are respectively connected to each of sockets 17 and 18 by electrical conductors 54 and 56, thereby providing electrical shorting thereof.

Figure 6:
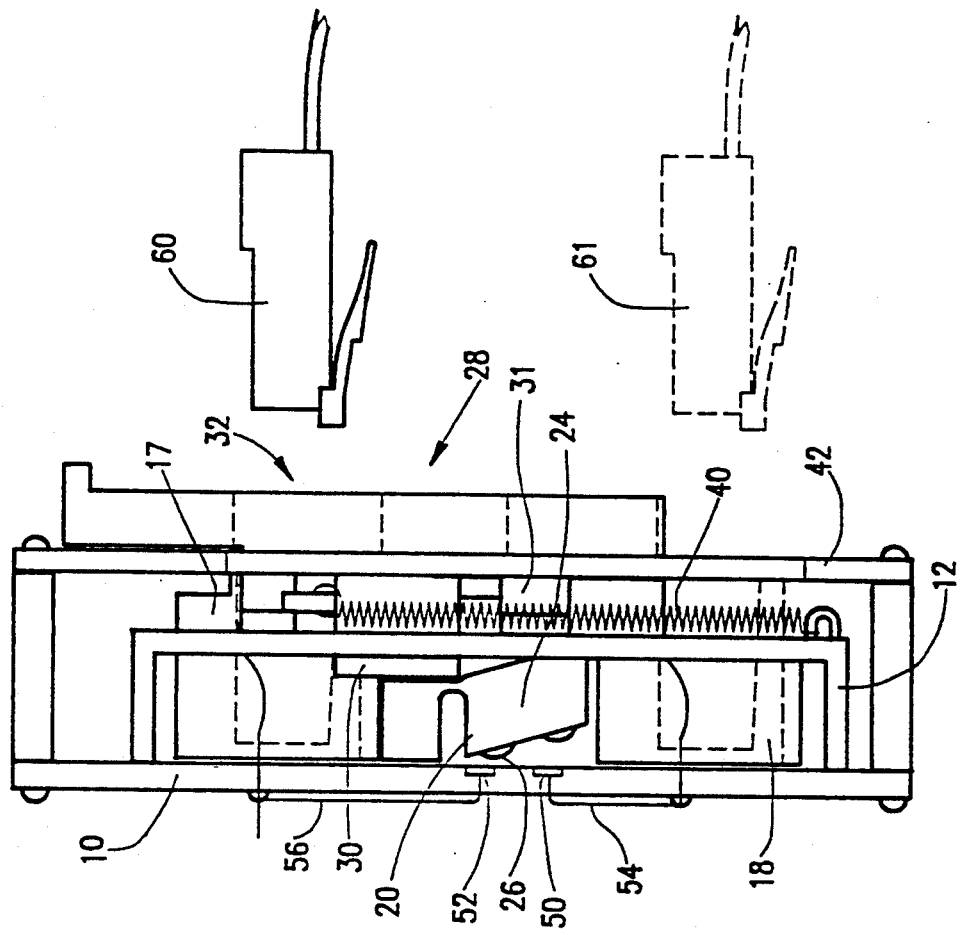
FIG. 6 is a side view sectional illustration of a device for covering and patching in a second operative orientation.

Reference is now made to FIGS. 3 and 6, which illustrate part of the patching panel of FIG. 1 in a second operative orientation. In this orientation, the cover assembly 28 is oriented such that apertures 32 is aligned with socket 17 and socket 18 is exposed, thus providing access to the sockets for the insertion thereinto of corresponding plugs 60 and 61. It may be seen from a consideration of FIG. 6 that in this orientation, spring 40 is tensioned, and thus, the cover assembly must be retained in this second orientation against the urging of spring 40, as by insertion into a socket 17 of a plug 60.

It may be appreciated that in this second orientation, protrusion 30 no longer engages contact portion 24. Accordingly, due to the inherent resiliency of contactor 20, contact portion 24 is angled away from plate 10 such that contact spring 26, mounted thereon, is moved out of contact with contacts 50 and 52, thus breaking the electrical connection between the pair of sockets 17 and 18.

It may be appreciated that in the second orientation, plugs may be inserted in either or both of sockets 17 and 18 of a given terminal and thus connections between different terminals on the same patching panel or other panels may be effected as desired, as indicated in FIG. 3.

Figure 7:
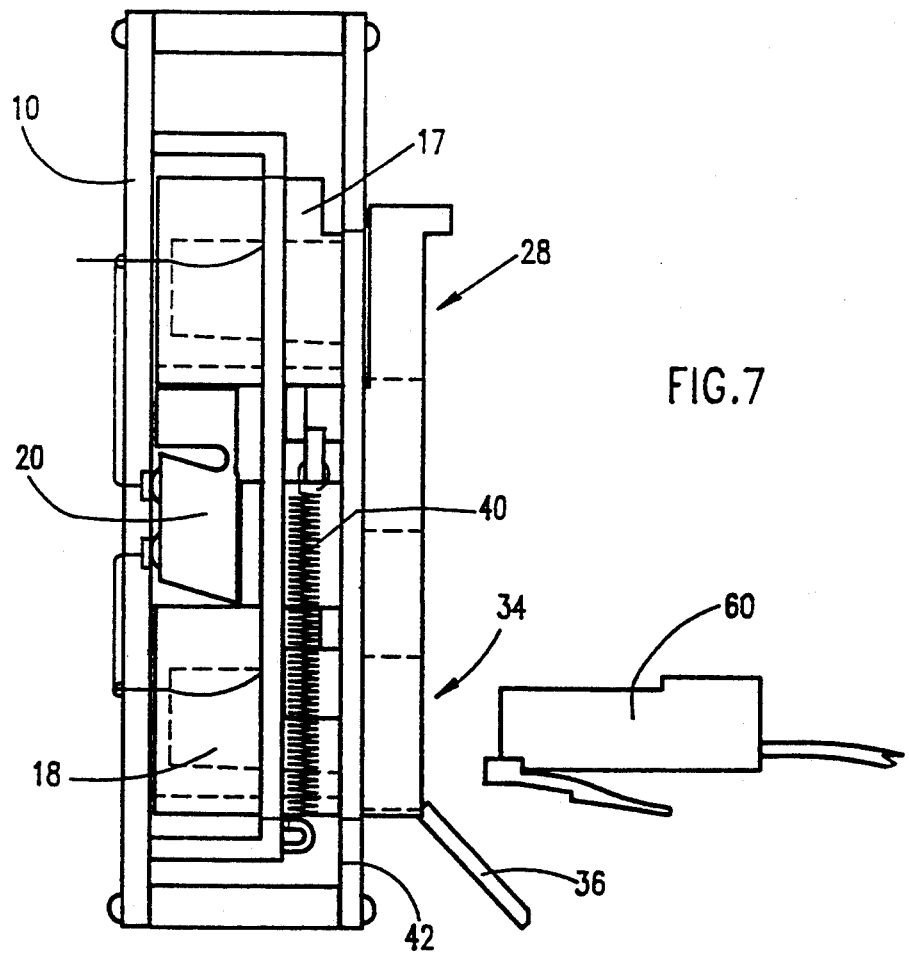
FIG. 7 is a side view sectional illustration of a device for covering, shorting and monitoring in a third operative orientation.

Reference is now made to FIGS. 4 and 7, which illustrate part of the patching panel of FIG. 1 in a third operative orientation. The third operative orientation is identical to the first operative orientation in terms of the overall orientation of the cover assembly 28, the contactor 20 and the spring 40 thus the two sockets 17 and 18 remain shorted together.

The only difference between the first and third operative orientations is that in the third operative orientation, the hinged cover 36 is opened to permit insertion of plug 60 through aperture 34, for purposes of monitoring.

It will be appreciated by persons skilled in the art that the present invention is not limited by what has been particularly shown and described hereinabove. Rather the scope of the present invention is defined only by the claims which follow:

I claim:

1. A patching panel comprising:
a plurality of port and user socket pairs; and
means for normally covering individual port and user socket pairs and normally and electrically shorting them together when in a first orientation and for uncovering both of the socket pair and breaking the electrical connection therebetween when in a second orientation.

2. Apparatus according to claim 1 and wherein said means for normally covering and shorting includes means for permitting one of the sockets to be uncovered without breaking the electrical connection between the pair of sockets.

3. Apparatus according to claim 2 and wherein said means for permitting comprises a hinged cover member which permits access to one of the sockets even when the means for normally covering and shorting is in the first orientation.

4. Apparatus according to claim 1 and wherein said means for normally covering and shorting is spring loaded to normally assume the first orientation.

5. Apparatus according to claim 2 and wherein said means for normally covering and shorting is spring loaded to normally assume the first orientation.

6. Apparatus according to claim 3 and wherein said means for normally covering and shorting is spring loaded to normally assume the first orientation.

7. Apparatus according to claim 1 and wherein said means for normally covering and shorting comprises a cover assembly including protrusion means and resilient contact means arranged to close an electrical connection between said pair of sockets when engaged by said protrusion means.

8. Apparatus according to claim 2 and wherein said means for normally covering and shorting comprises a cover assembly including protrusion means and resilient contact means arranged to close an electrical connection between said pair of sockets when engaged by said protrusion means.

9. Apparatus according to claim 3 and wherein said means for normally covering and shorting comprises a cover assembly including protrusion means and resilient contact means arranged to close an electrical connection between pair of sockets when engaged by said protrusion means.

10. Apparatus according to claim 4 and wherein said means for normally covering and shorting comprises a cover assembly including protrusion means and resilient contact means arranged to close an electrical connection between said pair of sockets when engaged by said protrusion means.

11. Apparatus according to claim 7 and wherein said protrusion means is arranged to engage said resilient contact means for closing of said electrical connection when said cover assembly is in a first operative orientation.

12. Apparatus according to claim 8 and wherein said protrusion means is arranged to engage said resilient contact means for closing of said electrical connection when said cover assembly is in a first operative orientation.

13. Apparatus according to claim 9 and wherein said protrusion means is arranged to engage said resilient contact means for closing of said electrical connection when said cover assembly is in a first operative orientation.

14. Apparatus according to claim 10 and wherein said protrusion means is arranged to engage said resilient contact means for closing of said electrical connection when said cover assembly is in a first operative orientation.

* * * * *